United States Patent [19]

Bergsand

[11] 4,233,084
[45] Nov. 11, 1980

[54] DEVICE FOR TREATMENT OF ARTICLES WITH AT LEAST ONE TREATMENT AGENT

[75] Inventor: Karl A. Bergsand, Floda, Sweden

[73] Assignee: Göteborgs Maskinkonsult AB, Sweden

[21] Appl. No.: 968,559

[22] Filed: Dec. 11, 1978

[51] Int. Cl.³ .................................................. B08B 3/04
[52] U.S. Cl. ...................................... 134/67; 134/70; 134/125; 118/423
[58] Field of Search ....................................... 134/67–68, 134/70, 73, 83, 125–128; 118/423

[56] References Cited

U.S. PATENT DOCUMENTS

| | | | |
|---|---|---|---|
| 764,456 | 7/1904 | Grebe | 134/126 X |
| 921,697 | 5/1909 | Helgeson | 134/67 X |
| 1,864,064 | 6/1932 | Hall | 134/73 |
| 2,154,978 | 4/1939 | Galvin | 134/125 UX |
| 2,260,286 | 10/1941 | Allan | 134/67 X |

FOREIGN PATENT DOCUMENTS

| | | | |
|---|---|---|---|
| 357163 | 11/1961 | Switzerland | 134/73 |
| 412517 | 11/1966 | Switzerland | 134/125 |
| 3107 | of 1913 | United Kingdom | 134/67 |

*Primary Examiner*—Robert L. Bleutge
*Attorney, Agent, or Firm*—Ostrolenk, Faber, Gerb & Soffen

[57] ABSTRACT

In a conveyor module a conveyor is moving in a plane oriented at an angle relative to the vertical and transports articles through one or more treatment zones in a container. The conveyor is preferably of the endless type having two parallel runs. A number of holders on the conveyor provide, together with a guide and an article support below the conveyor, movable holding spaces for articles. Two or more conveyor modules can be arranged in series, allowing articles to move in an even flow from one to the other by means of gravity. By using, for example, a degreasing agent as a treatment agent an automatic degreasing device is obtained.

14 Claims, 12 Drawing Figures

DEVICE FOR TREATMENT OF ARTICLES WITH AT LEAST ONE TREATMENT AGENT

The present invention relates to a device for treatment of articles with at least one treatment agent.

In industry it is often necessary to clean metal articles after a processing step. This can be accomplished by exposing the articles to a degreasing agent in a container. Small metal articles are often collected into a special container that is moved through a cleaning zone. One kind of such equipment is described in U.S. Pat. No. 3,871,394. The known equipment is rather complicated and space demanding. Besides, only certain cleaning operations can be performed. Since the articles are collected in a container, a batch type operation is obtained.

A different kind of equipment is described in Swedish Pat. No. 340 285, where a drum type container is rotating around a horizontal axis. Articles are fed to open pockets at the inside of the drum. By rotation of the drum, the pockets pass through a treatment zone and then the articles fall out onto an outlet. Since the articles move only in a vertical plane, it is difficult to provide several kinds of treatment zones without using much space.

The purpose of the invention is to eliminate the drawbacks of prior art devices and to provide a device that utilizes space in a more efficient way and is simple and reliable.

This is accomplished according to the invention by providing a device where a conveyor is arranged to move articles into, through and out of a treatment zone along a slanting plane, e.g. a plane oriented at a certain angle relative to the vertical. Preferably, the conveyor is of the endless type having two essentially parallel runs.

The present invention will be described in more detail, with reference to the accompanying drawing, in which.

Figures 1, 3:
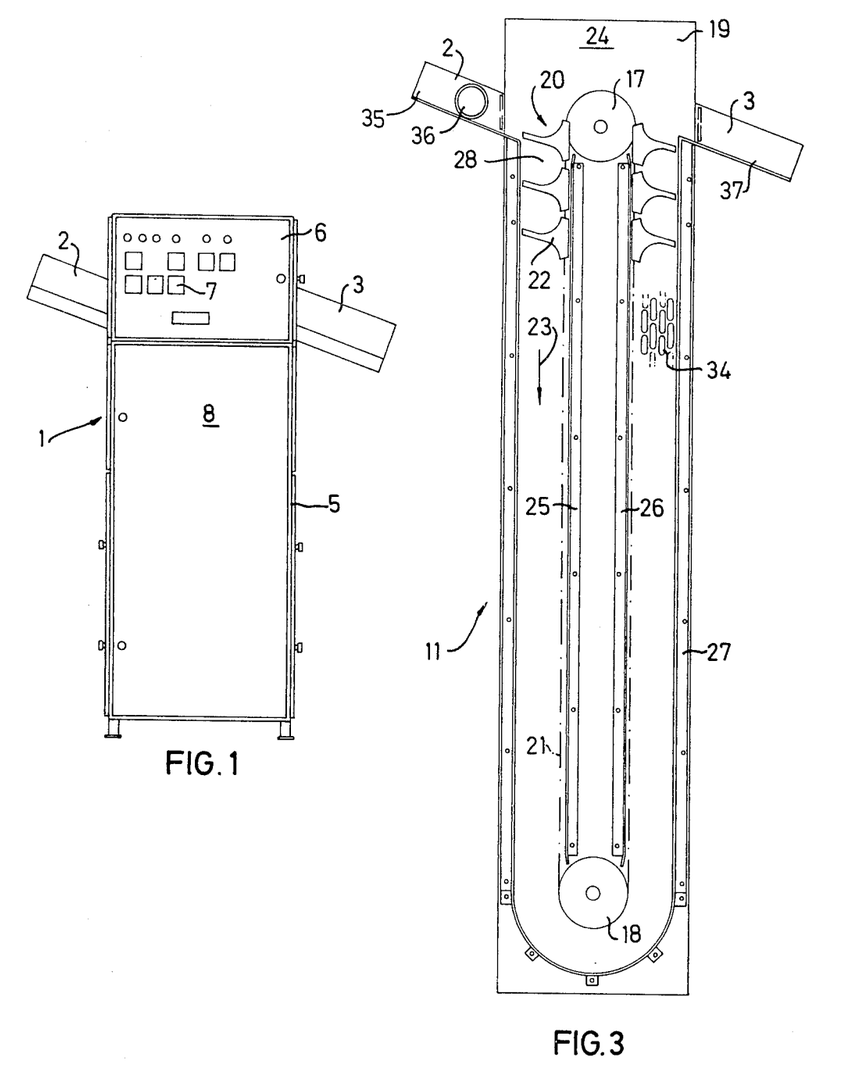
FIG. 1 shows a front view of a single module device according to the invention.
FIG. 3 shows a front view of a conveyor module used for the device in FIGS. 1 and 2.
Figure 2:
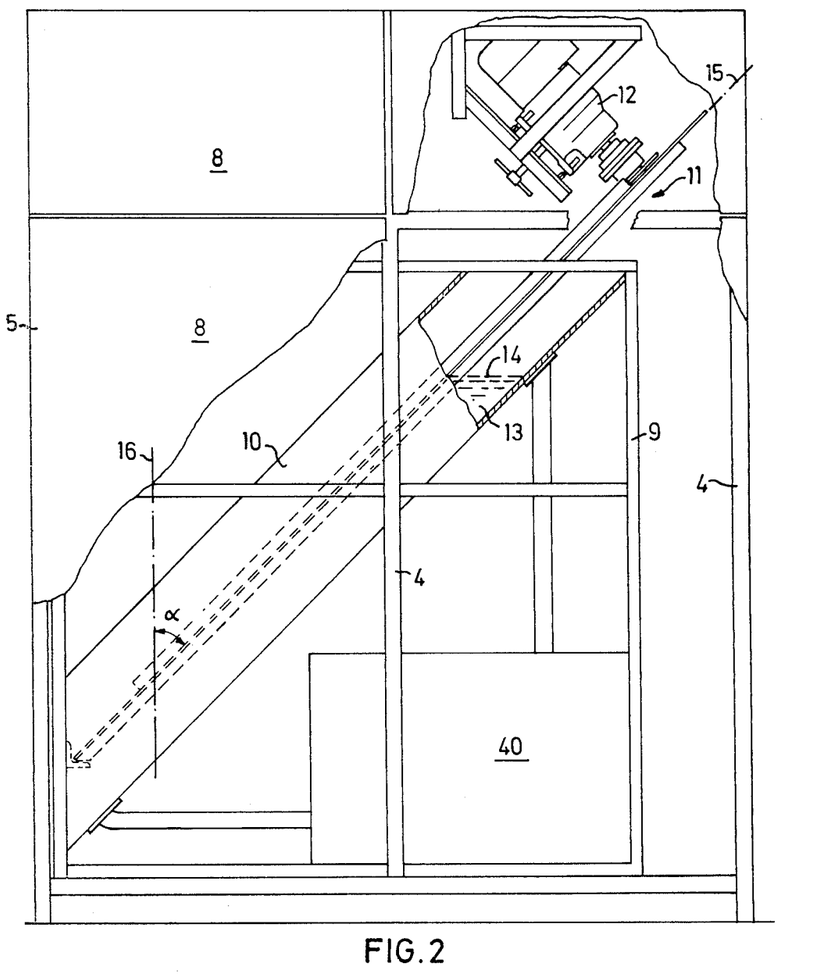
FIG. 2 shows a side view, partly in section, of the device in FIG. 1.

In FIGS. 1 and 2 there is shown a device 1 for treatment of articles that enter the device via an inlet 2 and leave the device via an outlet 3. The device 1 comprises a frame 4 which supports a protective housing 5, on the front of which there is a control panel 6 for various control means 7. The housing 6 comprises a number of panels 8 which can be removed or opened for easy access to the interior of the housing.

Within the housing 5 there is provided a support 9 for a container 10. A conveyor module 11 extends into the container 10. Above the container 10 the conveyor module 11 is connected to a motor 12 that is secured to the frame 4. The conveyor module 11 receives articles via the inlet 2, lowers them into the container 10 and raises them out of the container again so that they can be delivered via the outlet 3 after having been exposed to treatment within the container 10.

In FIG. 2 the container 10, which is closed at its lower end and is open at its upper end, is filled with a treatment agent 13 up to a level 14 and thus constitutes a receptacle for treatment agent. Below the level 14 the conveyor module 11 is therefore located in a treatment zone into which articles are lowered and out of which articles are raised. As an example, the treatment agent may be a liquid for degreasing metal articles.

As seen in FIG. 2 the conveyor module 11 has a conveying plane represented by the line 15 and oriented at a predetermined angle $\alpha$ relative to a line 16 representing the vertical. At least the lower end of the conveyor module 11 is supported within the container 10.

In FIG. 3 there is shown a front view of the conveyor module 11, where two pulley means 17 and 18 are located at a distance from each other and are rotatably secured to a generally planar article support 19. Cooperating with the two pulley means is a conveyor 20 which comprises a flexible carrier means 21 to which are secured a number of holders 22. The upper pulley means 17 is driven by the motor 12 and engages the conveyor 20 to circulate it in the direction indicated by arrow 23. In this way the conveyor 20 has a downward run and an upward run.

The holders 22 slide along the support face 24 of the article support 19 and are guided by guides 25, 26 and 27 secured to the article support 19. The two guides 25 and 26 are generally straight and are oriented parallel to the lengthwise direction of the conveyor 20. The guide 27 is generally U-shaped, having its parallel sections parallel to the guides 25 and 26. Each two adjacent holders 22 define, together with the support face 24 and the guide 27, a movable holding space, typically denoted by 28, for one or more articles.

Figure 4:
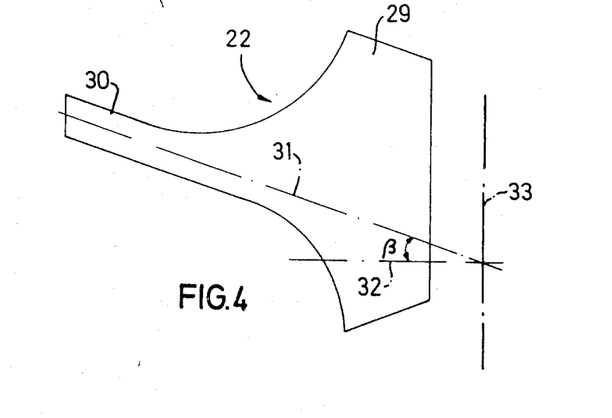
FIG. 4 shows a top view of a holder used in the conveyor module.

As is seen from FIGS. 3 and 4, each holder 22 has a base portion 29 for attachment to the carrier means 21, which can be a chain or other suitable endless, flexible means. From the base portion 29 extends an arm 30 pointing away from the carrier means 21. Said arm 30 serves to separate two adjacent holding spaces 28 from each other and is with its lengthwise direction, indicaed by line 31, preferably oriented at an angle $\beta$ relative to a line 32 perpendicular to the lengthwise direction 33 of the conveyor. The angle $\beta$ is preferably such that an arm 30 located on the downward run is sloping upward towards its free end, as indicated in FIG. 3.

In order to allow passage of treatment agent from one side to the other of the conveyor module 11, the article support 19 is provided with a suitable number of perforations or holes 34, as indicated in FIG. 3. This allows the articles that are being treated to be efficiently exposed to treatment agent, and it also allows residues removed from the articles to escape from the conveyor module 11 and to accumulate in the container 10.

The position of the inlet 2 and the outlet 3 can be varied between a high position indicated in FIG. 3 and a low position adjacent to the pulley means 18. It is of course also possible to vary the mutual position of the inlet 2 and the outlet 3, depending on the requirements in the processing line where the device 1 is normally intended to be included.

At the inlet 2 there is provided an inlet guide 35 which is sloping downward towards the conveyor 20, so that an article 36 on the inlet guide is guided into the holding space 28 temporarily located opposite the inlet 2. (Of course more than one article can be allowed to enter the holding space, if desired.) Preferably the slope and shape of the inlet guide 35 is such that an article 36 can move along the inlet guide by rolling or sliding, or by a combination of these movements, e.g. move by means of gravity acting on the article. If required, however, the article can of course be fed to the conveyor 20 in other ways, such as by pushing. The downward slope of the arm 30 helps the article to enter a holding space 28. Once received in a holding space 28 the rate of the downward movement along the support face 24 is controlled by the speed of the conveyor 20. The article can, depending on shape, weight and friction against the support face 24, roll, guide or make a combined rollinggliding movement. At the bottom portion of the conveyor 20 the article is supported by the curved portion of the guide 27, and at the upward run of the conveyor 20 the article will be in contact with the straight portion of the guide 27, because of the now downward slope of the arms 30. At the outlet 3 the article will leave the conveyor on an outlet guide 37, which is preferably sloping away from the conveyor to allow the article to move away by gravity. Such movement is assisted by the downward slope of the arm 30 temporarily at the outlet 3. It would, however, also be possible to use a special mechanism to force articles to leave the conveyor.

Figure 5:
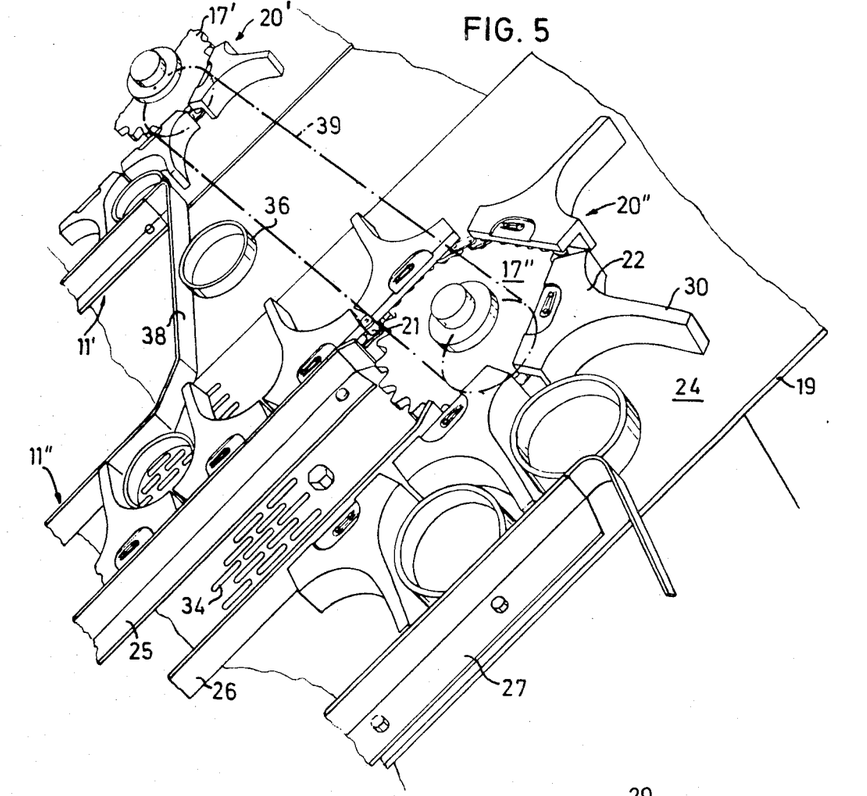
FIG. 5 shows a detail perspective view of two conveyor modules arranged in series.

Two or more conveyor modules 11 can be arranged in series in a particularly advantageous way if the outlet of a first conveyor module is located higher than the inlet of the next conveyor module. In this way articles can move along a connecting guide between the modules by means of gravity, thus eliminating the need for extra feeding mechanisms. Such an arrangement of two conveyor modules in series is indicated in FIG. 5, where only upper portions of two conveyor modules are indicated. The cylindrical article 36 has just left a conveyor module 11' and is rolling down a connecting guide 38 to enter a conveyor module 11''. The conveyors 20' and 20'' are synchronized via a driving means 39 located on the rear of the two conveyor modules and engaging extensions of the pulley means 17' and 17''. In this way only one motor 12 is needed, since the driving means 39 imparts movement to the pulley means 17 not driven by the motor 12. Preferably an article leaving a holding space at the module 11' should be able to enter directly the holding space at the module 11''.

Figure 6:
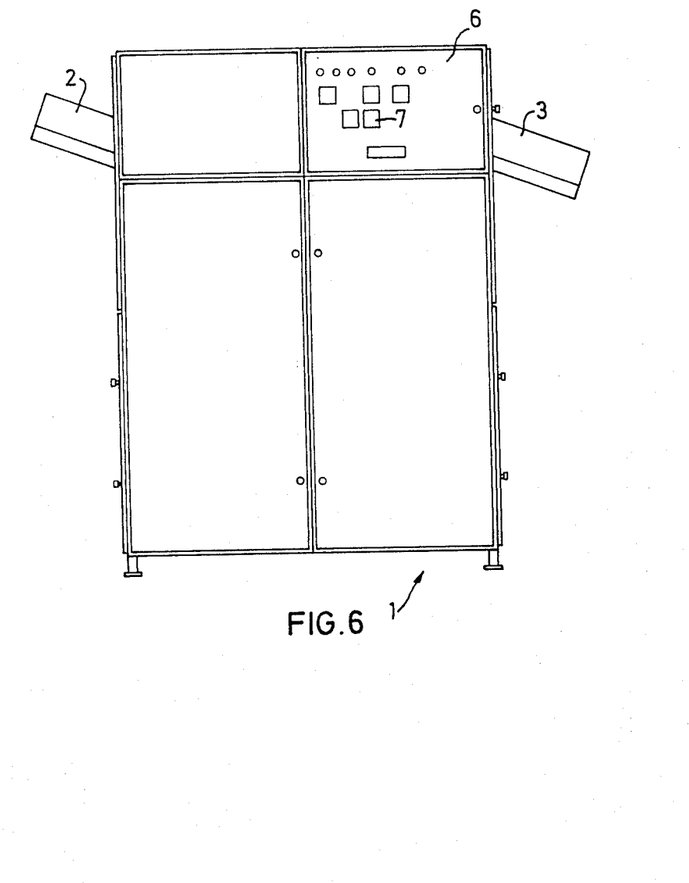
FIG. 6 shows a front view of a twin module device.

Two or more conveyor modules 11', 11'' arranged in series can be accommodated in a common container 10, but normally it is desirable to have a container 10 for each conveyor module. An example of a twin-module device is indicated in FIG. 6, where a basic module of the kind indicated in FIGS. 1 and 2, shown to the right, is combined with a further module, shown to the left. The further module, which has a separate container, requires no motor 12 if an arrangement of the kind indicated in FIG. 5 is used.

In case of malfunction the entire conveyor module 11 can easily be disconnected and removed for repair or exchange, thus reducing standstills to a minimum. It is also possible to arrange, as indicated in FIG. 2, sustaining equipment needed for the treatment to be performed in the container 10, on the support 9, as schematically indicated at 40. By making the support 9 removable, container 10, conveyor module 11 and equipment 40 can be removed together for repair or replacement, thus eliminating the need to replace the entire device.

The articles passing through a container 10 can be given various kinds of treatment, depending on where in a production run a device according to the invention is located. A few out of many alternatives are indicated in FIG. 7, where containers 10 of different shape have different contents.

Figure 7A:
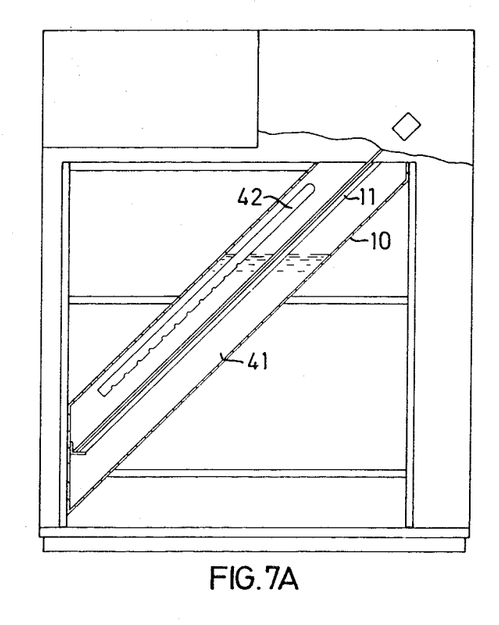
FIGS. 7A-F show, schematically, alternative treatment zone arrangements.

FIG. 7A shows a cooling module where the container 10 holds a cooling bath 41 for which a cooler 42 is provided.

Figure 7B:
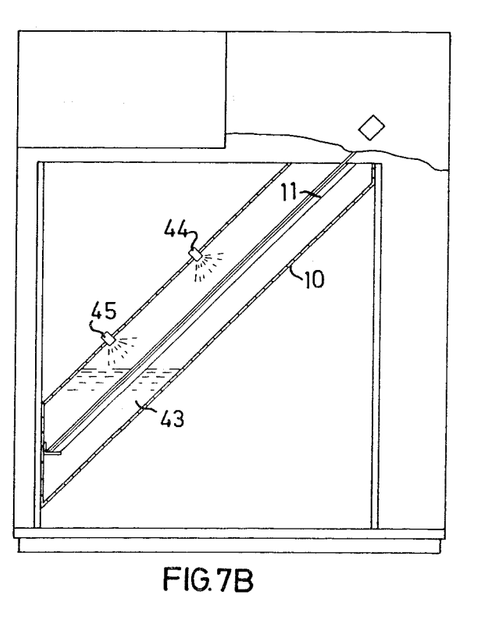

FIG. 7B shows a cleaning module, for instance for cleaning bearings and bearing rings or other kinds of objects. There is a cleaning bath 43, above the level of which there is a device 44 for spraying with clean condensate, and a device 45 for spraying with recirculating solvent.

FIGS. 7C–7F show a different type of arrangement where the container 10 by means of a partition 45 is divided into two compartments S and L, of which S represents the smaller compartment and L the larger compartment. In each of the examples there is in the lower region of the larger compartment L a boiling liquid zone 46 above which there is, in sequence, a vapor zone 47 and a free board zone 48.

Figure 7C:
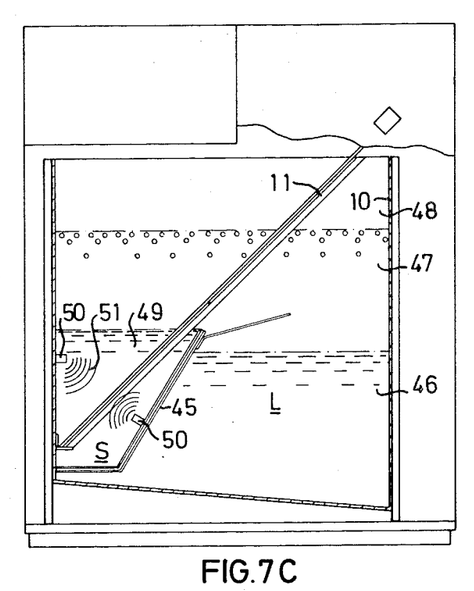

FIG. 7C shows a degreasing module using ultrasonics. In the boiling liquid zone 46 there is a boiling solvent, and in the smaller compartment S there is a bath 49 and also one or more ultrasonic transmitters 50 for transmitting ultrasonic waves 51 towards the articles to be cleaned.

Figure 7D:
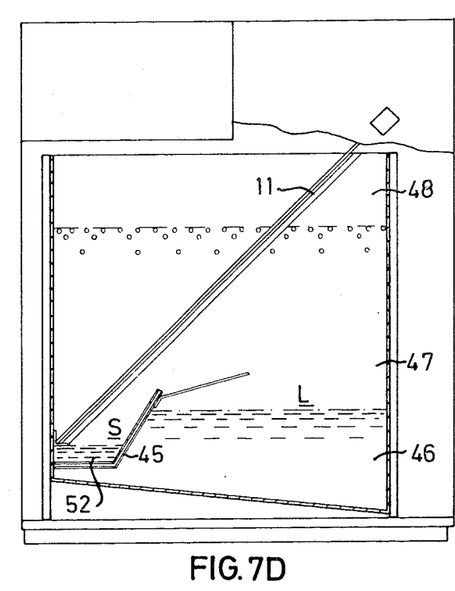

FIG. 7D shows a vapor degreasing module where there is boiling solvent in the boiling liquid zone 46. At the bottom of the smaller compartment S condensated dirty solvent 52 is collected.

Figure 7E:
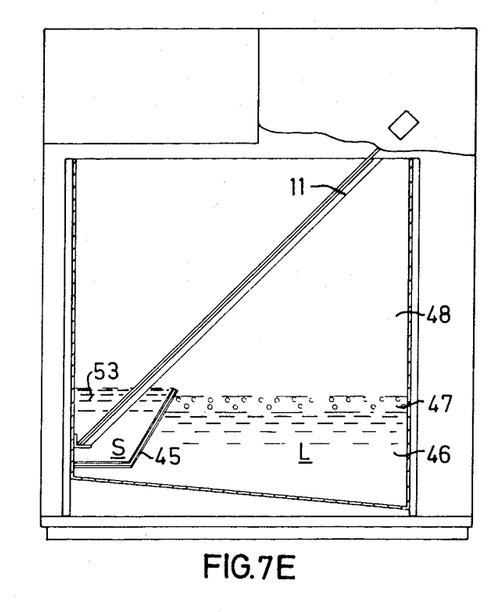

FIG. 7E shows an oiling or preservation module where the boiling liquid zone 46 contains boiling solvent with oil. The smaller compartment S contains a bath 53 of solvent and oil.

Figure 7F:
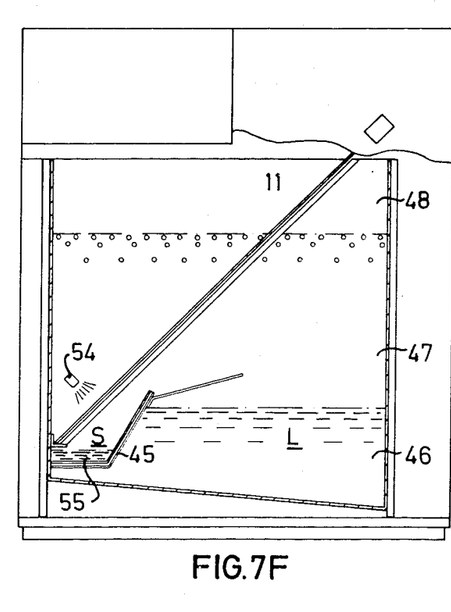

FIG. 7F, finally, shows an emulsion module, where the boiling solvent zone 46 contains boiling solvent. In the smaller compartment S there is a device 54 for flushing with clean condensate, and in the lower region of said compartment there is a bath 55 of dirty liquid.

Obviously there is needed various kinds of equipment to circulate, heat, cool, spray, flush, clean etc. in order to create proper treatment conditions. Since such equipment of many kinds is commercially readily available it has not been shown in detail here, but only been generally indicated by 40 in FIG. 2.

By adapting the inventive device it could also find many other applications, for instance within the food processing industry. Because the conveyor module 11 is arranged at an angle $\alpha$ relative to the vertical, it is possible to have a relatively long run through even a rather shallow liquid or vapor zone at the same time that various residues from previous operation steps are easily removed. Since the downward and upward runs can be located close together, little space is required.

By using a conveyor of the kind disclosed, careful handling of easily damaged articles, such as precision worked articles, can be obtained, since the articles can be prevented from contacting each other.

In order to secure good performance, the angle $\alpha$ should be in the region between about 30° and about 60°. Preferably, the value for $\alpha$ should be in the region between about 40° and about 55°. A proper value of the angle $\alpha$ is important to enable the articles to automatically leave the conveyor at the outlet. Obviously, the value for $\oplus$ is related to the value for $\alpha$. The smaller $\alpha$ is, the smaller $\beta$ needs to be, and the greater $\alpha$ is, the greater $\beta$ needs to be. In the embodiment shown, where $\beta$ is about 45°, a good value for $\beta$ has been found to be about 20°, but in other embodiments $\beta$ could be allowed to vary between about 5° and about 35°. In addition to the angle $\alpha$, also the frictional properties of the support face 24 will obviously influence the minimum value required for $\beta$.

During operation, the holders 22 of the conveyor module will often move between regions of different temperature. In order to minimize heat transfer because of said movement, the holders are preferably made of a material having low heat conductivity.

Various modifications of the device disclosed above can obviously be made within the scope of the invention, depending on requirements.

What I claim is:

1. A device for treatment of articles with at least one treatment agent, comprising at least one conveyor module for transporting articles through at least one treatment zone where the articles are exposed to treatment with at least one treatment agent, said conveyor module comprising a conveyor having two runs, a first run for lowering articles into the treatment zone and a second run for raising articles out of the treatment zone, said runs being interconnected in the treatment zone and generally being located in a conveyor plane oriented at an angle relative to the vertical; said conveyor being of the endless type having two generally parallel runs; the conveyor module comprising adjacent to the conveyor an article support having a support face generally parallel to the conveyor plane and being located so as to allow articles to be moved by means of the conveyor along the support face; said support face having passages to allow passage of treatment agent from one side to the other; and the angle between the conveyor plane and the vertical being greater than 30° but less than 60°; the treatment zone being located within a container having an opening for the conveyor module; said container being provided with a partition dividing the container into a larger and a smaller compartment, the conveyor module extending through the larger compartment and with its lower end into the smaller compartment, there being provided different treatment agents in the two compartments.

2. A device according to claim 1, said conveyor module having two pulley means for the conveyor, a first pulley means located in the treatment zone and a second, driven pulley means located above the treatment zone.

3. A device according to claim 1, the conveyor comprising a flexible carrier means cooperating with the pulley means, there being attached to the carrier means a number of holders, each two adjacent holders defining, together with the support face and a guide means, a movable holding space for one or more articles.

4. A device according to claim 3, each holder having a base portion attached to the carrier means, and on the side facing away from the carrier means an arm separating two adjacent holding spaces.

5. A device according to claim 4, said arm being oriented at an angle relative to a line perpendicular to the lengthwise direction of the conveyor, said angle being such that an arm, when located on the downward run, is sloping upward towards its free end.

6. A device according to claim 5, said angle being greater than 5° but less than 35°.

7. A device according to claim 6, said angle preferably being about 20°.

8. A device according to claim 5, there being provided at the downward run an inlet guide and at the upward run an outlet guide for articles entering and leaving the conveyor module, respectively, said guides being oriented at an angle relative to a line perpendicular to the lengthwise direction of the conveyor, so as to allow articles to enter and leave the conveyor by means of gravity.

9. A device according to claim 5, comprising at least two conveyor modules, said conveyor modules being arranged in series, a first conveyor module having its outlet located higher than the inlet of the next conveyor module, there being provided between said outlet and said inlet a connecting guide allowing articles to move by means of gravity between two adjacent conveyors.

10. A device according to claim 9, there being provided a common drive motor for the conveyor modules.

11. A device according to claim 3, the holders being made of a material having low heat conductivity.

12. A device according to claim 3, said guide means being generally U-shaped, the curved segment of the U being located at the low end of the conveyor, below the holders.

13. A device according to claim 1, said angle being greater than 40° but less than 55°.

14. A device according to claim 1, the partition being located generally below the conveyor module.

* * * * *